(12) United States Patent
Ventura et al.

(10) Patent No.: US 9,399,921 B2
(45) Date of Patent: Jul. 26, 2016

(54) HUB PILOTING DIAMETER WITH RELIEF CUTS

(71) Applicant: HAMILTON SUNDSTRAND CORPORATION, Windsor Locks, CT (US)

(72) Inventors: Peter Ventura, Enfield, CT (US); Thomas G. Corley, Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 596 days.

(21) Appl. No.: 13/854,215

(22) Filed: Apr. 1, 2013

(65) Prior Publication Data

US 2014/0133990 A1    May 15, 2014

Related U.S. Application Data

(60) Provisional application No. 61/724,314, filed on Nov. 9, 2012.

(51) Int. Cl.
| | | |
|---|---|---|
| *B64C 11/00* | (2006.01) | |
| *F01D 5/30* | (2006.01) | |
| *F01D 5/00* | (2006.01) | |
| *B64C 11/02* | (2006.01) | |

(52) U.S. Cl.
CPC .............. *F01D 5/303* (2013.01); *B64C 11/02* (2013.01); *F01D 5/005* (2013.01); *Y10T 29/49318* (2015.01)

(58) Field of Classification Search
CPC ......... F01D 5/005; F01D 5/303; F01D 5/021; F01D 5/023; F01D 5/025; F01D 5/3023; F01D 5/3046; B64C 11/02; B64C 11/14; B64C 11/04; Y10T 29/49318; F04D 29/20; F04D 29/263; F04D 29/266; F04D 29/26; F04D 29/32; F04D 29/325; F04D 29/329; F04D 29/34; F03B 3/128; B23P 15/02; B23P 6/00; B23P 6/002; B23P 19/042; B23P 2700/13
USPC ...... 416/219 R, 244 R, 204 R, 205; 29/889.1; 415/215.1
See application file for complete search history.

(56) References Cited

U.S. PATENT DOCUMENTS

| | | | |
|---|---|---|---|
| 2,523,651 | A | 9/1950 | Doussain |
| 4,045,122 | A | 8/1977 | Burdick |
| 4,212,586 | A | 7/1980 | Aguiar |
| 5,049,034 | A | 9/1991 | Cahoon |
| 5,102,301 | A | 4/1992 | Morrison |

(Continued)

OTHER PUBLICATIONS

European Search Report for European Application No. 13191401.2 completed on Mar. 7, 2014.

*Primary Examiner* — Thomas Denion
*Assistant Examiner* — Kelsey Stanek
(74) *Attorney, Agent, or Firm* — Carlson, Gaskey & Olds, PC

(57) ABSTRACT

A hub for mounting propeller blades has a plurality of mount locations for receiving propeller blades at a radially outer location. The hub has a piloting diameter centered on a center axis. The hub has a plurality of openings to receive a drive member for transmitting rotation/torque from an adapter. There are reliefs cut into the piloting diameter at locations circumferentially aligned with the openings.

16 Claims, 3 Drawing Sheets

(56) References Cited

U.S. PATENT DOCUMENTS

| | | | |
|---|---|---|---|
| 5,720,595 A * | 2/1998 | Avny | F16H 41/28 416/180 |
| 6,241,473 B1 | 6/2001 | Soule et al. | |
| 6,413,052 B1 * | 7/2002 | Corley | B64C 11/02 416/204 R |
| 6,514,044 B2 | 2/2003 | Talasco et al. | |
| 7,192,255 B2 | 3/2007 | Gaiani | |
| 7,296,969 B2 | 11/2007 | Raes et al. | |
| 7,845,910 B2 | 12/2010 | Talasco et al. | |
| 8,118,562 B2 | 2/2012 | Raes et al. | |
| 2004/0206586 A1 | 10/2004 | Hayes et al. | |
| 2009/0220344 A1 | 9/2009 | Pfeiffer et al. | |

\* cited by examiner

HUB PILOTING DIAMETER WITH RELIEF CUTS

CROSS-REFERENCE TO RELATED APPLICATION

This application claims priority to U.S. Provisional Application Ser. No. 61/724,314, filed Nov. 9, 2012.

BACKGROUND OF THE INVENTION

This application relates to a hub for mounting propeller blades where a piloting diameter is formed on an inner diameter, and has reliefs cut at locations circumferentially aligned with openings.

Propeller blades are often mounted within a hub connected to an adapter through a plurality of connecting members which may be press-fit. The adapter is connected to a source of drive, such as a driveshaft.

The press-fit connecting members can cause deformation at locations circumferentially aligned with the openings.

SUMMARY

A hub has a plurality of mount locations for receiving propeller blades at a radially outer location. The hub has a piloting diameter centered on a center axis. The hub has a plurality of openings to receive a connection member for transmitting rotation/torque from an adapter. There are reliefs cut into the piloting diameter at locations circumferentially aligned with the openings. A system is also disclosed.

These and other features may be best understood from the following drawings and specification.

DETAILED DESCRIPTION

Figure 1:
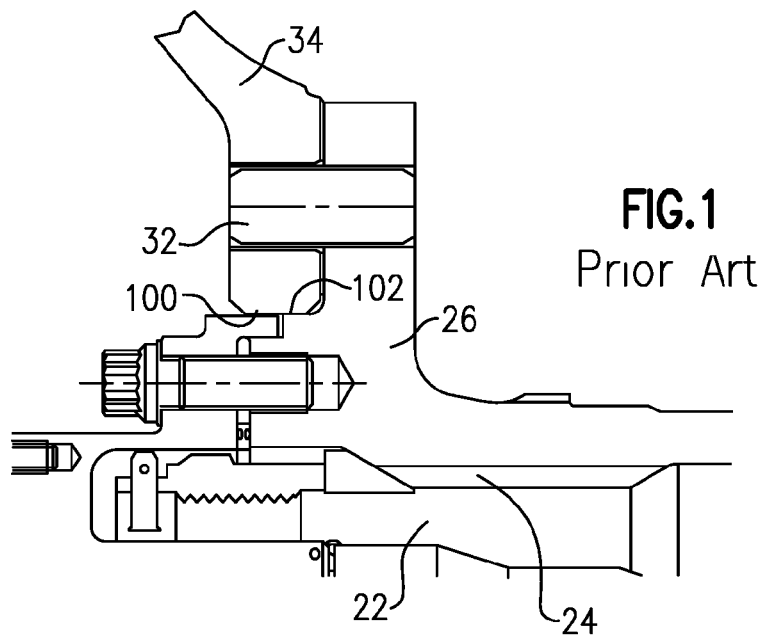
FIG. 1 shows a prior art arrangement.

A hub 34 is shown in FIG. 1 illustrating a press-fit dowel pin 32 installed in the hub 34 which is used to transmit torque/rotation from a driveshaft 22 to propeller blades. Alternatively, a dowel bolt or other connection member may be used. An inner piloting diameter 100 of hub 34 sits on an outer piloting diameter 102 of an adapter 26. The adapter is secured, such as by splines 24, to driveshaft 22.

Figure 2:
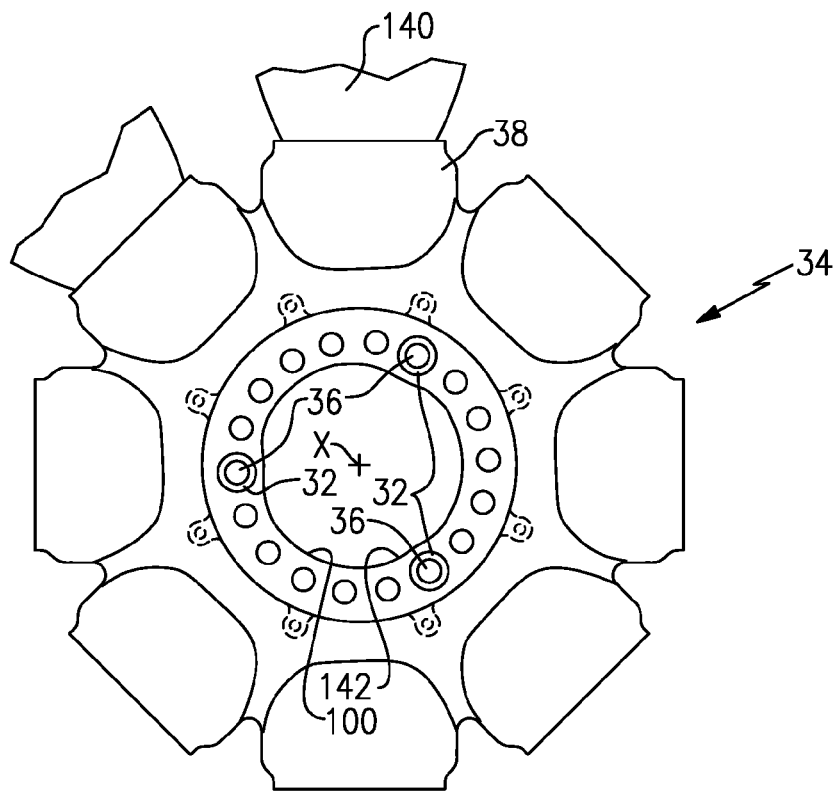
FIG. 2 shows a detail of the prior art.

As shown in FIG. 2, the hub 34 includes a plurality of press-fit dowel pins 32 in the openings 36 spaced circumferentially about a center line X which transmit the rotation of the driveshaft 22 to the hub 34 and propeller blades 140. Mount locations 38 receive propeller blades 140. The piloting diameter 100 may be locally deformed, such as shown at 142, at locations circumferentially aligned with the openings 36 as a result of the press fit between the dowel pins 32 and the hub 34.

Figure 3:
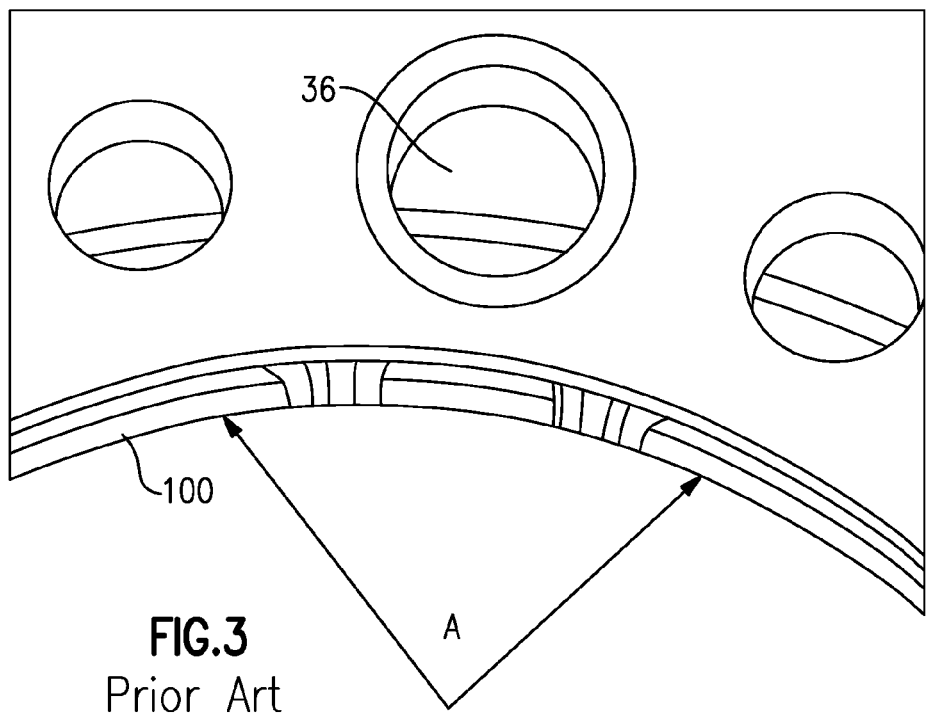
FIG. 3 shows an issue raised in the prior art.

FIG. 3 shows a portion of the piloting diameter 100 across an angle A. Hoop stresses across this portion range from very high stresses centered on the opening 36, and decrease moving circumferentially away from the center of opening 36. These hoop stresses are the result of the press fit of the dowel pin 32 in the opening 36 and results in the deformation mentioned above.

The piloting diameters 100 and 102 are utilized to center the adapter 26 and hub 34. With the deformation 142 from the press-fit dowel pins/dowel bolts, lobes are created which become contact point(s) between the piloting diameter 100, and the piloting diameter 102. The parts rub under load, and fretting can occur, which can cause a reduction in fatigue strength. This has sometimes resulted in fatigue cracks.

Figure 4:
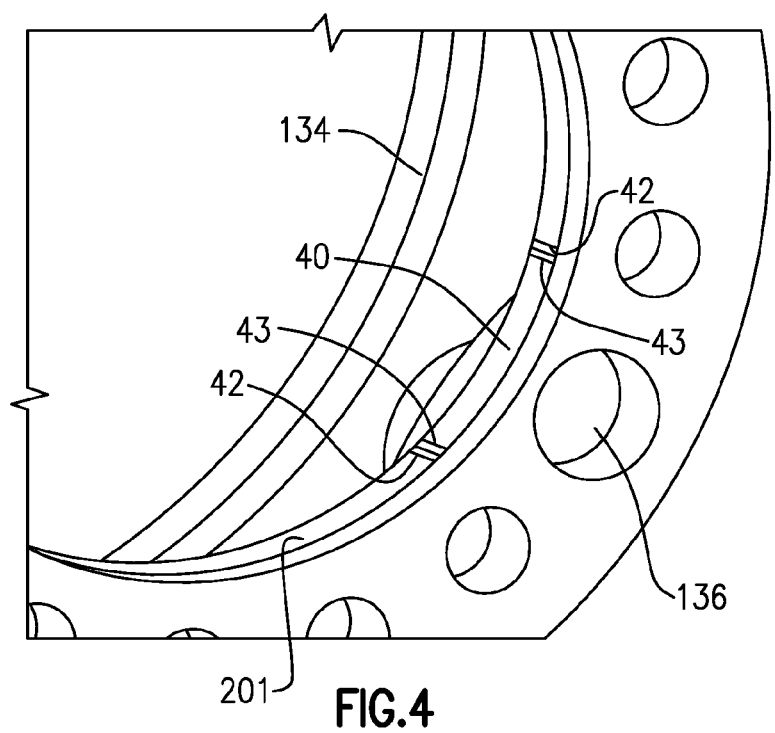
FIG. 4 shows an inventive hub.

FIG. 4 shows a relief 40 cut into the piloting diameter 201 of an inventive hub 134. As shown, the relief 40 is circumferentially positioned across a circumferential extent of the opening 136 which will receive the press-fit dowel pin or dowel bolt. The relief 40 can be seen to have a transition radius between points 42 and 43 at each circumferential extent.

Figure 5:
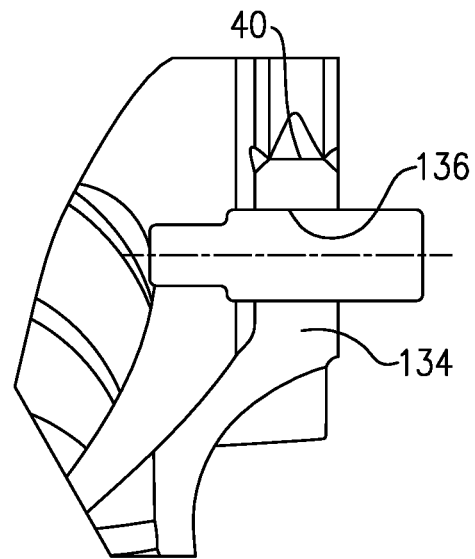
FIG. 5 shows a detail of one embodiment.

As shown in FIG. 5, the relief 40 extends across an entire axial length of the hub flange 134.

Figure 6:
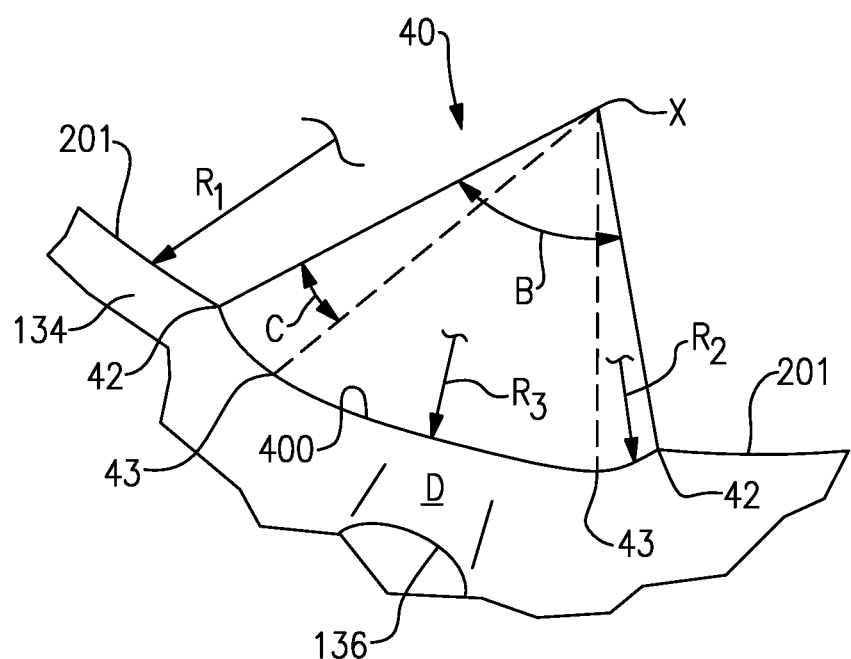
FIG. 6 shows another feature of the FIG. 5 embodiment.

FIG. 6 shows a detail of the relief 40. A nominal pilot diameter 201 is formed at a radius $R_1$. In one embodiment, $R_1$ was 3.876 inch (9.845 centimeter).

At a point 42, a transition blend begins and extends to an end 43 leading into a nominal portion 400 of the relief 40. The same transition blend is found at the opposed circumferential end of nominal portion 400. The transition portion between points 42 and 43 is formed by a convex and concave radius $R_2$. This radius should be as large as possible to minimize contact edge affects and stress raisers. In one embodiment, $R_2$ was 0.5 inch (1.27 centimeter).

The nominal portion 400 is shown to be formed at a radius $R_3$. In one embodiment, $R_3$ was 3.887 inch (9.873 centimeter). The values of $R_1$ and $R_3$ are defined such that contact between the piloting diameters do not occur in this region once the dowel pins 32, or dowel bolts (or other connection members), are pressed in the hub 34 while maintaining hoop stress values, due to the press fit, that are acceptable for the material used. These values may also be determined based on the ratio required to remove existing fretting from parts that have not been originally produced with the reliefs. Again, hoop stress values must be considered when determining this ratio. In embodiments, a ratio of $R_3$ to $R_1$ was between 1.0014 and 1.0043. A ratio of $R_3$ to $R_2$ was between 7.6871 and 7.8626.

As can be seen, the entire relief 40 including the transition portion 42-43 and the nominal portion 400 is formed across an angle B. In one embodiment, angle B was 50.18 degrees. In embodiments, angle B may be between 48.18 and 52.18 degrees. The transition portions extend across an angle C. In one embodiment, angle C was 7.25 degrees. In embodiments, angles B and C may result from required angles needed to remove existing fretting while maintaining significant circumferential pilot diameter to keep the mating parts centered. Angle B, in any case, should be such that the end of the transition 42 is located such that the hoop stress from the press fit is negligible. In embodiments, angle C may be between 5.25 and 9.25 degrees.

In these embodiments, the circumferential extent of the opening 136 is at an Angle D. Angle D is between 11.45 and 11.48 degrees. A ratio of angle B to angle D is between 4.197 and 4.557 in embodiments of this disclosure. All of the angles are measured from a center line X.

With the relief, the problems raised by the hub 34 deformation mentioned above, due to the press-fit of the dowel pin 32 or, alternatively, dowel bolt, are reduced.

A method of repairing a propeller system includes the steps of removing connecting members 32 from openings 36 in a hub 134 and an adapter 26, and placing a replacement hub 134 on the adapter 26 with the replacement hub having reliefs 40 cut into a piloting diameter 201 at locations circumferentially aligned with the openings. As understood the adapter 26 can be structured and function as in the prior art FIG. 1.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A hub for mounting propeller blades comprising:
a hub having a plurality of mount locations for receiving propeller blades at a radially outer location, and having a piloting diameter centered on a center axis, said hub having a plurality of openings to receive connection members for transmitting rotation/torque from an adapter, and there being reliefs cut into the piloting diameter at locations circumferentially aligned with said openings; and
wherein there are transition blends at each of two circumferential ends of said reliefs, which transitions said reliefs into said piloting diameter.

2. The hub as set forth in claim 1, wherein said relief having a nominal relief portion at a nominal diameter which is greater than said piloting diameter, and a ratio of said nominal diameter to said piloting diameter being between 1.0014 and 1.0043.

3. The hub as set forth in claim 2, wherein said transition blends are formed at a transition radius, and a ratio of said nominal diameter to said transition radius being between 7.6871 and 7.8626.

4. The hub as set forth in claim 3, wherein a relief angle is defined, which includes said transition blends and said nominal relief portion, and said relief angle being between 48.18 and 52.18 degrees.

5. The hub as set forth in claim 4, wherein said transition blends extend across a transition angle, and said transition angle being between 5.25 and 9.25 degrees.

6. The hub as set forth in claim 5, wherein said openings have a circumferential extent measured from a center axis of said hub for an opening angle, and said opening angle being between 11.45 and 11.48 degrees.

7. The hub as set forth in claim 6, wherein a ratio of said relief angle to said opening angle being between 4.197 and 4.557.

8. A system comprising:
a hub mounting a plurality of propeller blades;
an adaptor for securing said hub to a drive shaft;
said hub and said adaptor having a plurality of openings circumferentially aligned, connecting members extending through said opening, and each of said hub and said adaptor having a piloting diameter centered on a center axis, with one of said piloting diameters being on a radially outer surface and the other of said piloting diameters being on a radially inner surface, and there being reliefs cut into at least one of said piloting diameters at location circumferentially aligned with said openings; and
wherein there are transition blends at each of two circumferential ends of said reliefs which transitions said reliefs into said piloting diameter.

9. The system as set forth in claim 8, wherein said hub having a piloting diameter on said inner peripheral surface and said adaptor having said piloting diameter on said outer peripheral surface.

10. The system as set forth in claim 9, wherein said reliefs are cut into said piloting diameter on said inner peripheral surface of said hub.

11. The system as set forth in claim 10, wherein said relief having a nominal relief portion at a nominal diameter which is greater than said piloting diameter, and a ratio of said nominal diameter to said piloting diameter being between 1.0014 and 1.0043.

12. The system as set forth in claim 11, wherein said transition blends are formed at a transition radius, and a ratio of said nominal diameter to said transition radius being between 7.6871 and 7.8626.

13. The system as set forth in claim 12, wherein a relief angle is defined which includes said transition blends and said nominal relief portion, and said relief angle being between 48.18 and 52.18 degrees.

14. The system as set forth in claim 13, wherein said transition blends extend across a transition angle, and said transition angle being between 5.25 and 9.25 degrees.

15. The system as set forth in claim 14, wherein said openings have a circumferential extent measured from a center axis of said hub for an opening angle, and said opening angle being between 11.45 and 11.48 degrees.

16. The system as set forth in claim 15, wherein a ratio of said relief angle to said opening angle being between 4.197 and 4.557.

* * * * *